United States Patent
Ito et al.

(10) Patent No.: US 8,030,877 B2
(45) Date of Patent: Oct. 4, 2011

(54) DEVICE AND METHOD FOR DETECTING BACK ELECTROMOTIVE FORCE PHASE AND DEVICE AND METHOD FOR CONTROLLING EXCITATION

(75) Inventors: Daisuke Ito, Osaka (JP); Hideaki Mori, Hyogo (JP); Yasunori Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 12/367,855

(22) Filed: Feb. 9, 2009

(65) Prior Publication Data
US 2009/0243526 A1 Oct. 1, 2009

(30) Foreign Application Priority Data
Mar. 25, 2008 (JP) ................................ 2008-078783

(51) Int. Cl.
G05B 19/40 (2006.01)
(52) U.S. Cl. ............... 318/685; 318/400.09; 318/400.34
(58) Field of Classification Search .................. 318/685, 318/400.34, 400.36, 599, 700, 400.01, 720, 318/400.09
See application file for complete search history.

(56) References Cited

U.S. PATENT DOCUMENTS

| 5,103,151 A | 4/1992 | Kondo et al. |
| 2003/0234623 A1 | 12/2003 | Douglas |
| 2004/0232874 A1 | 11/2004 | Fukamizu et al. |
| 2007/0216325 A1 * | 9/2007 | Fukamizu et al. ............ 318/254 |

FOREIGN PATENT DOCUMENTS

| JP | 10-243693 | 9/1998 |
| JP | 2004-350386 | 12/2004 |

* cited by examiner

Primary Examiner — Karen Masih
(74) Attorney, Agent, or Firm — McDermott Will & Emery LLP

(57) ABSTRACT

In a back electromotive force phase detecting device, a timing generating unit generates a timing signal indicating a start timing, an intermediate timing and an end timing of a 180-degree electrical angle period in a detection target phase, from an excitation pulse signal. A difference calculating unit receives the timing signal, and calculates a difference between a total PWM control period of the detection target phase during a first-half 90-degree period, and a total PWM control period of the detection target phase during a second-half 90-degree period. In an excitation control device, a control unit changes the capability of driving a motor based on an output of the back electromotive force phase detecting device.

18 Claims, 7 Drawing Sheets

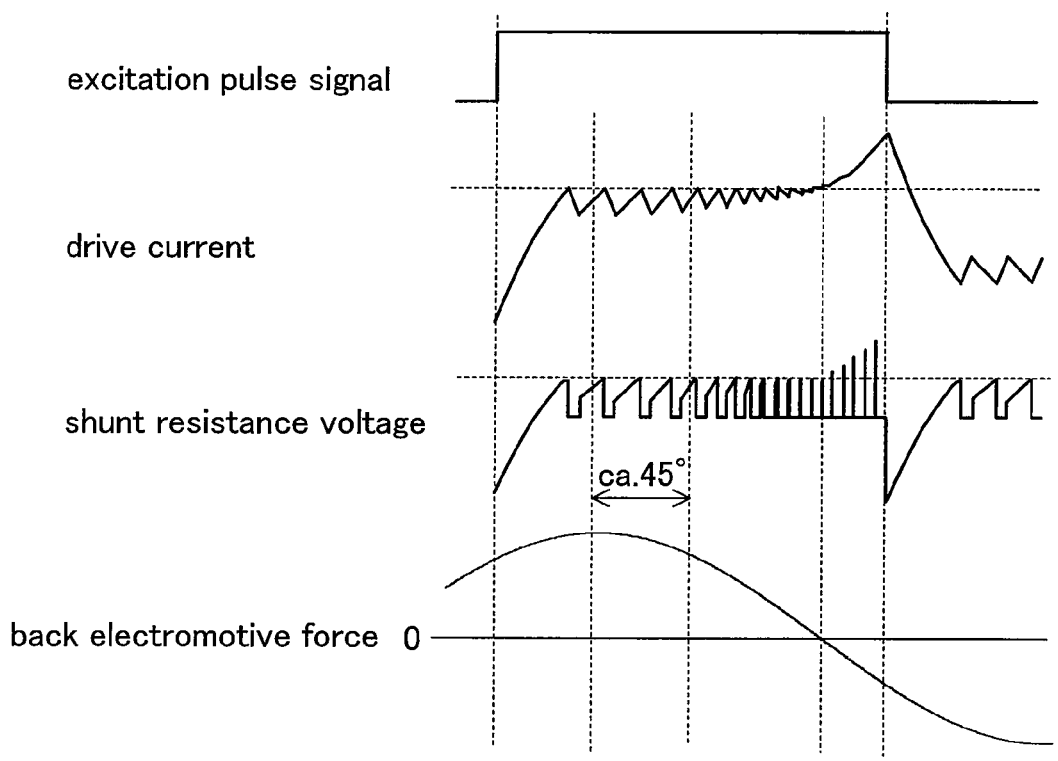
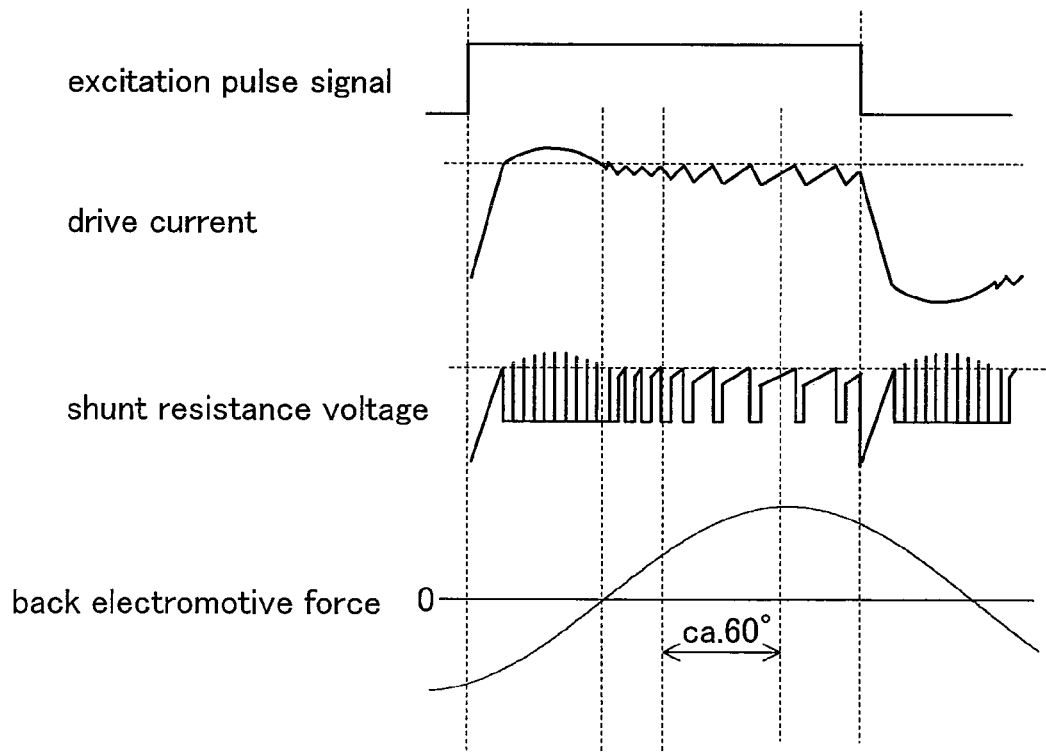

us 8,030,877 B2

DEVICE AND METHOD FOR DETECTING BACK ELECTROMOTIVE FORCE PHASE AND DEVICE AND METHOD FOR CONTROLLING EXCITATION

BACKGROUND OF THE INVENTION

The present disclosure relates to back electromotive force phase detection and excitation control for a stepper motor. More particularly, the present invention relates to back electromotive force phase detection and excitation control for a two-phase excitation stepper motor that is operated by constant-current PWM drive.

Stepper motors are generally driven by an open-loop control. Therefore, if a drive current is insufficient (i.e., drive torque is insufficient), then the stepper motor immediately falls out of synchronization. Therefore, an excessive amount of drive current is supplied to the stepper motor so as to secure a sufficient drive torque margin to overcome any load torque.

In order to reduce the power consumption of the stepper motor, it is necessary to detect a sign that the stepper motor will fall out of synchronization during an increase in load torque that occurs suddenly, and increase a drive current as required. Conventionally, an angle deviation that is a difference between a drive current phase and a back electromotive force phase is calculated based on the result of detection by a detector for monitoring the status of motor drive, such as a position sensor, an acceleration sensor or the like, and based on the angle deviation, a sign that the stepper motor will fall out of synchronization is detected.

SUMMARY OF THE INVENTION

However, if the detector is attached to the motor, not only cost increases, but also the number of parts increases, i.e., the number of factors for failure increases. In view of this problem, an object of the present invention is to detect a back electromotive force phase without providing a detector for a two-phase excitation stepper motor that is driven with constant-current PWM. Another object of the present invention is to provide an excitation control that can prevent the stepper motor from falling out of synchronization, based on the result of such detection of a back electromotive force phase.

To achieve the object, the present invention provides the following means. A first aspect of the present invention is directed to a device or method for detecting a back electromotive force phase of a motor coil of a two-phase excitation stepper motor that is driven with constant-current PWM. The device or method includes a timing generating unit for or step of generating a timing signal indicating a start timing, an intermediate timing and an end timing of a 180-degree electrical angle period in a detection target phase, from excitation pulse signals indicating respective current passage directions of two current passage phases, and a difference calculating unit for or step of receiving the timing signal, and calculating a difference between a total PWM control period of the detection target phase during a first-half 90-degree period defined by the start timing and the intermediate timing, and a total PWM control period of the detection target phase during a second-half 90-degree period defined by the intermediate timing and the end timing. Thereby, the first-half 90-degree period and the second-half 90-degree period during the 180-degree electrical angle period in the detection target phase of the back electromotive force phase are specified from the excitation pulse signals. A delay or lead and its magnitude of the back electromotive force phase with respect to a drive current phase are represented by the difference between the total PWM control periods of the detection target phase during the first-half 90-degree period and the second-half 90-degree period.

A second aspect of the present invention is directed to an excitation control device or method for controlling a motor drive device for driving a stepper motor by two-phase excitation with constant-current PWM. The device or method includes a control pulse generating unit for or step of supplying a control pulse indicating a rotation angle of the stepper motor to the motor drive device, a reference voltage generating unit for or step of supplying to the motor drive device a reference voltage that is a reference for the constant-current, and a control unit for instructing the reference voltage generating unit to change the reference voltage or a step of changing the reference voltage, based on an output of the back electromotive force phase detecting device or a result of the detection by the back electromotive force phase detecting method. Thereby, it is possible to prevent the motor from falling out of synchronization by changing the capability of driving the motor based on the detected back electromotive force phase.

BRIEF DESCRIPTION OF THE DRAWINGS

FIG. 5 is a diagram showing waveforms of various signals when a back electromotive force phase leads by an electrical angle of about 45 degrees.

FIG. 6 is a diagram showing waveforms of various signals when a back electromotive force phase delays by an electrical angle of about 60 degrees.

DETAILED DESCRIPTION OF THE PREFERRED EMBODIMENTS

Hereinafter, a best mode for carrying out the present invention will be described with reference to the accompanying drawings.

First Embodiment

Figure 1:
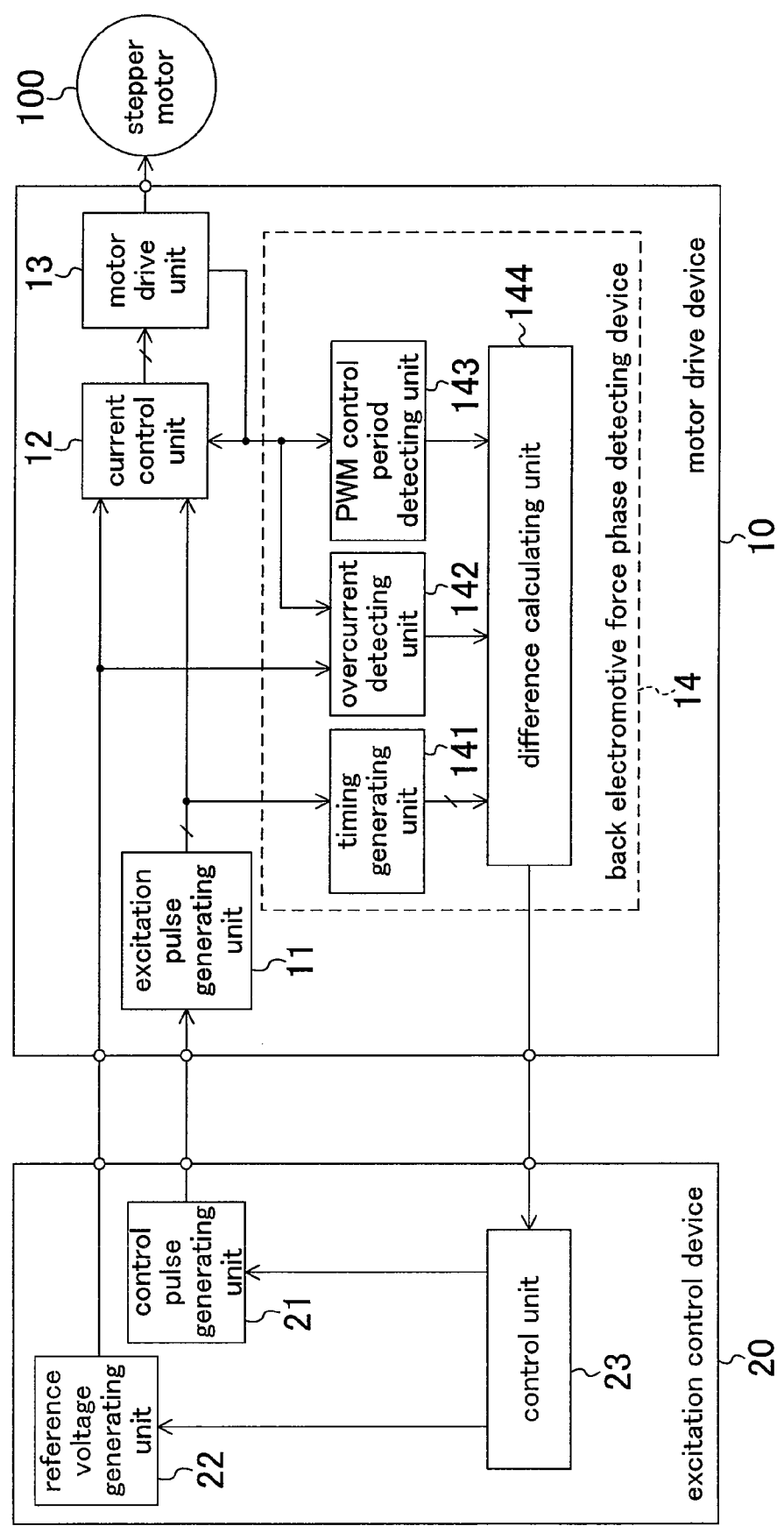
FIG. 1 is a diagram showing a configuration of a system for driving a two-phase excitation stepper motor according to a first embodiment of the present invention.

FIG. 1 shows a configuration of a system for driving a two-phase excitation stepper motor according to a first embodiment. In a motor drive device 10, an excitation pulse generating unit 11 generates an excitation pulse signal for adjusting and determining timing with which each motor coil of a motor 100 is excited based on supplied control pulses. A current control unit 12 generates an excitation control signal for performing constant-current PWM drive with respect to the motor 100, based on a supplied excitation pulse signal, a reference voltage, and a shunt resistance voltage. The motor drive unit 13 performs constant-current PWM drive with respect to the motor 100 by means of two-phase excitation in accordance with a supplied excitation control signal.

Figure 2:
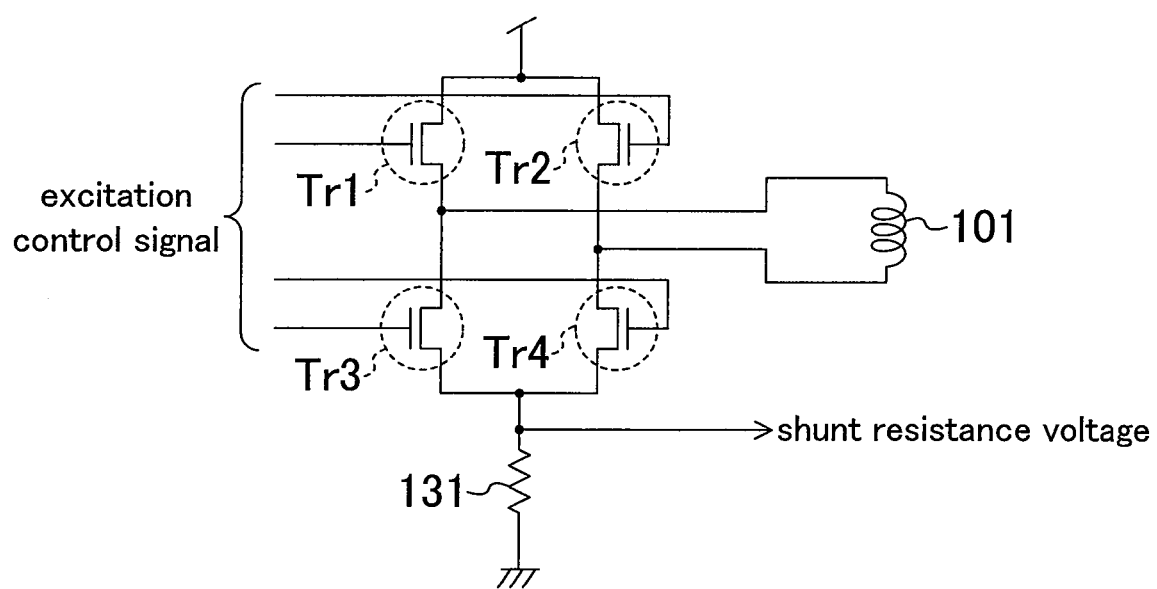
FIG. 2 is a diagram showing an internal configuration of a current control unit.

FIG. 2 shows an internal configuration of the motor drive unit 13. Four transistors Tr1, Tr2, Tr3 and Tr4 constitute an H bridge. By switching and controlling these transistors, a magnitude and a direction of a drive current flowing through a motor coil 101 in the motor 100 are changed. A shunt resistance 131 receives the drive current flowing through the motor coil 101 to generate a shunt resistance voltage.

Figure 3:
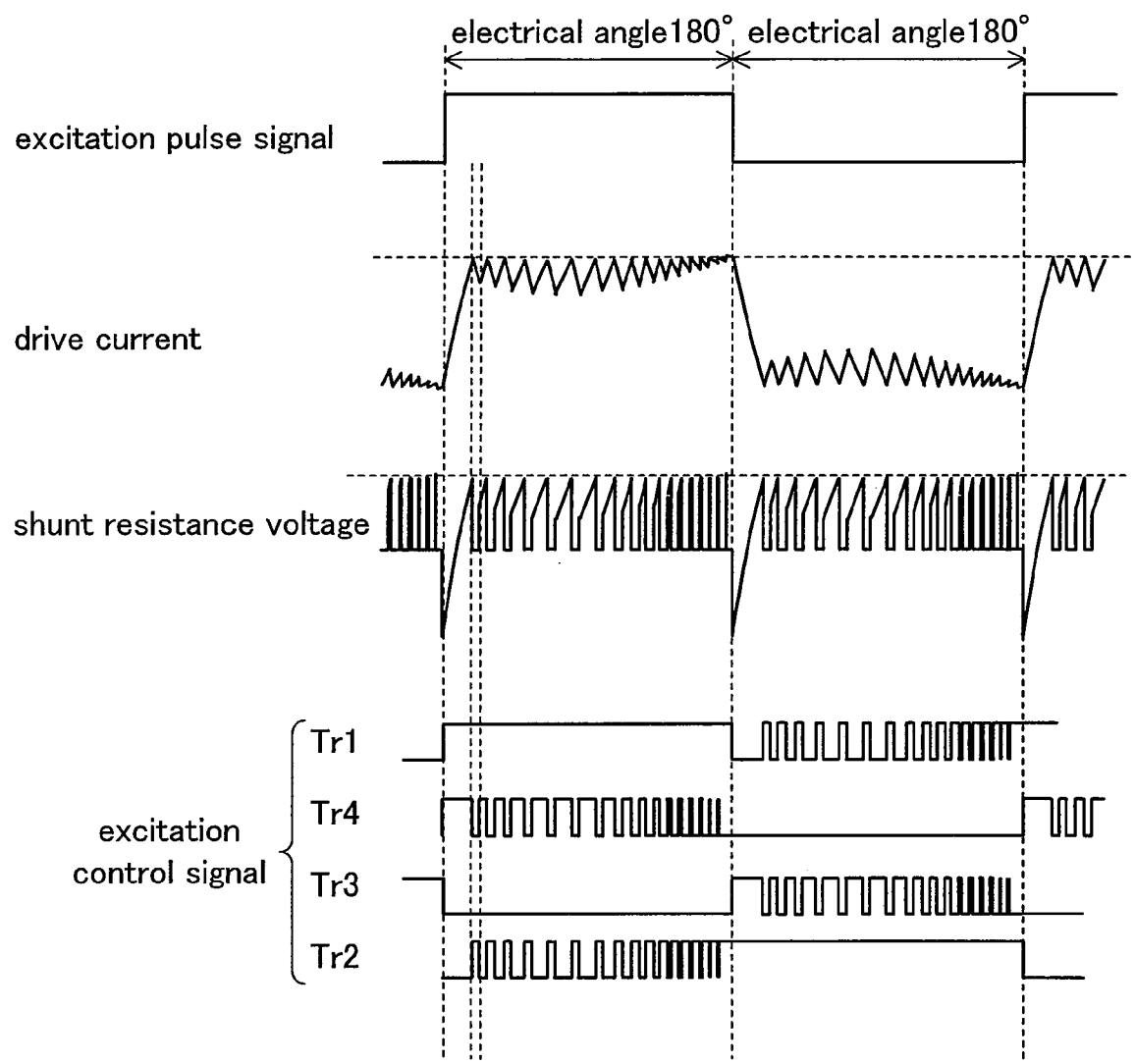
FIG. 3 is a diagram showing waveforms of various signals during one cycle of an excitation pulse signal related to a certain phase.

FIG. 3 shows waveforms of various signals during one cycle of the excitation pulse signal related to a certain phase. The logic level of the excitation pulse signal, which represent the directions of current passage corresponding to the phase, is switched every 180 degrees (electrical angle). During a 180-degree electrical angle period in which the excitation pulse signal is at the H level, the transistors Tr1 and Tr3 are supplied with excitation control signals fixed to the H level and the L level, respectively, and the transistors Tr2 and Tr4 are supplied with respective pulse-width-modulated excitation control signals. When the excitation control signals supplied to the transistors Tr2 and Tr4 are at the L level and the H level, respectively (energization period (also referred to as a PWM ON period)), a drive current flows in a direction: a power supply→the transistor Tr1→the motor coil 101→the transistor Tr4→the ground, so that the drive current and the shunt resistance voltage increase with time. When the excitation control signals supplied to the transistors Tr2 and Tr4 are at the H level and the L level, respectively (loop period (also referred to as a PWM OFF period)), a drive current flows in a direction: the power supply→the transistor Tr1→the motor coil 101→the transistor Tr2→the power supply, so that the drive current decreases with time and the shunt resistance voltage is zero.

On the other hand, during a 180-degree electrical angle period in which the excitation pulse signal is at the L level, the transistors Tr2 and Tr4 are supplied with excitation control signals fixed to the H level and the L level, respectively, and the transistors Tr1 and Tr3 are supplied with pulse-width-modulated excitation control signals. When the excitation control signals supplied to the transistors Tr1 and Tr3 are at the L level and the H level, respectively (energization period), a drive current flows in a direction: the power supply→the transistor Tr2→the motor coil 101→the transistor Tr3→the ground, so that the drive current and the shunt resistance voltage increase with time. When the excitation control signals supplied to the transistors Tr1 and Tr3 are at the H level and the L level, respectively (loop period), a drive current flows in a direction: the power supply→the transistor Tr2→the motor coil 101→the transistor Tr1→the power supply, so that the drive current decreases with time and the shunt resistance voltage is zero.

Thus, when the drive current supplied to the motor 100 reaches a predetermined value, i.e., the shunt resistance voltage reaches a predetermined voltage, the current control unit 12 switches patterns of the excitation control signal input to the motor drive unit 13, thereby switching the current passage state from the energization state to the loop state. After a predetermined time elapses since the current passage state is switched to the loop state, the current control unit 12 switches the current passage state back to the energization state. In this manner, the current control unit 12 performs constant-current PWM drive, more specifically, PWM OFF period constant drive.

<Principle of Detection of Back Electromotive Force Phase>

When a drive current is supplied to the motor coil 101, back electromotive force occurs in the motor coil 101. Here, the magnitude of the back electromotive force is proportional to a reduction in drive current during the loop period. Therefore, since the drive current decreases, depending on the magnitude of the back electromotive force, during the loop period, it is derived that the magnitude of the back electromotive force is proportional to the shunt resistance voltage immediately after the current passage state is switched from the loop state to the energization state. Also, as the reduction in drive current during the loop period increases, the drive current is supplied for a longer time during the next energization period. Therefore, it is derived that the PWM ON period is proportional to the magnitude of the back electromotive force. Also, when the PWM OFF period is constant, since the PWM ON period changes in proportion to the magnitude of the back electromotive force, it is derived that a PWM duty is also proportional to the magnitude of the back electromotive force. Therefore, the magnitude of the back electromotive force can be indirectly known from any of the reduction in drive current, the shunt resistance voltage, the PWM ON period, and the PWM duty.

Figure 4:
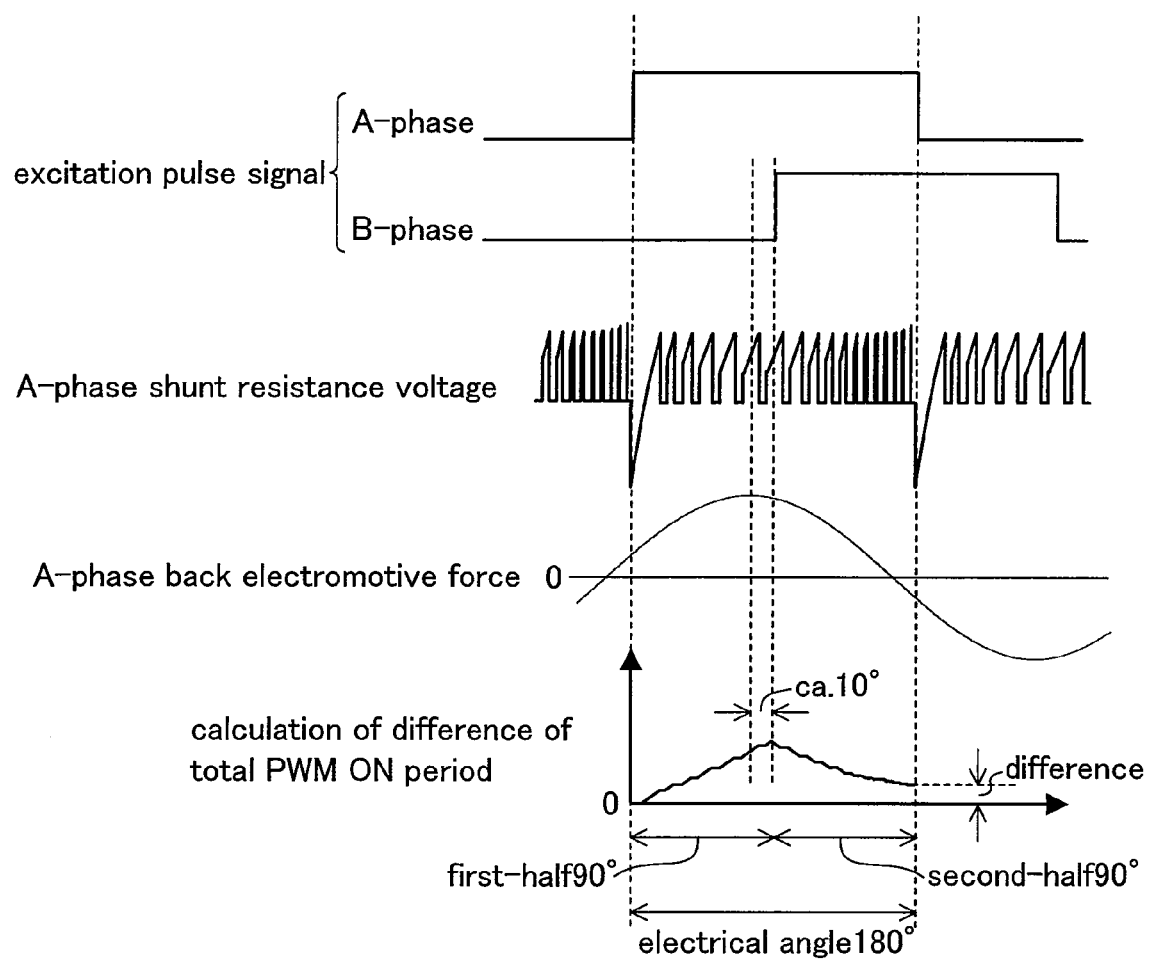
FIG. 4 is a diagram for describing the principle of detection of a back electromotive force phase.

The principle of detection of the back electromotive force phase will be described with reference to FIG. 4. In the case of two-phase excitation, excitation is performed in accordance with excitation pulse signals having an A-phase and a B-phase that are deviated from each other by an electrical angle of 90 degrees. It is here assumed that back electromotive force occurring in the A-phase leads by an electrical angle of about 10 degrees with reference to the phase of the A-phase excitation pulse signal. In this case, a timing at which the back electromotive force is maximum leads by an electrical angle of about 10 degrees from a timing at which the B-phase excitation pulse signal rises, and falls within a first-half 90-degree period from rising of the A-phase excitation pulse signal to rising of the B-phase excitation pulse signal, of a 180-degree electrical angle period that is the ON duty period of the A-phase excitation pulse signal. Therefore, an average value of the back electromotive force during the first-half 90-degree period is larger than an average value of a second-half 90-degree period from rising of the B-phase excitation pulse signal to falling of the A-phase excitation pulse signal. Here, since the magnitude of the back electromotive force is proportional to the PWM ON period, a direction and a magnitude of a phase deviation of the back electromotive force with respect to the drive current can be found from a difference between a total PWM ON period during the first-half 90-degree period and a total PWM ON period during the second-half 90-degree period.

The difference can be calculated by adding PWM ON periods during the first-half 90-degree period and subtracting PWM ON periods during the second-half 90-degree period. By the calculation method, the difference has a positive value in the example of FIG. 4. The sign of the difference represents the direction of a phase deviation, and the absolute value of the difference represents the magnitude of the phase deviation. Therefore, from the result of calculation, it is found that the phase of the back electromotive force leads by an electrical angle of about 10 degrees from the drive current. Alternatively, the difference may be calculated by subtracting PWM ON periods during the first-half 90-degree period and adding PWM ON periods during the second-half 90-degree period. In this case, the sign of the difference is only reversed as compared to the former calculation method. On the other hand, when the difference is calculated from the duty, PWM ON periods may be added and PWM OFF periods are subtracted during the first-half 90-degree period, and PWM ON periods may be subtracted and PWM OFF periods may be added during the second-half 90-degree period, for example.

FIG. 5 shows waveforms of various signals when the back electromotive force phase leads by an electrical angle of about 45 degrees. FIG. 6 shows waveforms of various signals when the back electromotive force phase delays by an electrical angle of about 60 degrees. When there is a large phase difference between the back electromotive force and the drive current, a period occurs during which constant-current PWM drive cannot be performed. During such a period, the drive current and the shunt resistance voltage exceed respective thresholds. Therefore, when the difference is calculated, it is preferable to ignore a PWM ON period during such a period that constant-current PWM drive cannot be performed. Alternatively, during the period that constant-current PWM drive cannot be performed, the calculation method may be preferably changed (e.g., addition may be changed to subtraction).

Note that it is not necessary to cause the 180-degree electrical angle period during which the difference is calculated to coincide with the ON or OFF duty of the excitation pulse signal, i.e., the 180-degree electrical angle period can have any start timing. Also, the aforementioned back electromotive force phase detecting method is applicable to PWM ON period constant drive. In this case, since the PWM OFF period is proportional to the magnitude of the back electromotive force, a difference between a total PWM OFF period during the first-half 90-degree period and a total PWM OFF period during the second-half 90-degree period may be calculated.

Embodiment of Back Electromotive Force Phase Detecting Device

Referring back to FIG. 1, in the motor drive device 10, a back electromotive force phase detecting device 14 executes the aforementioned back electromotive force phase detecting method. In the back electromotive force phase detecting device 14, a timing generating unit 141 receives the A- and B-phase excitation pulse signals, and generates a timing signal indicating a start timing, an intermediate timing and an end timing of the 180-degree electrical angle period of a detection target phase. For example, the timing generating unit 141 generates a timing signal that indicates rising of the A-phase excitation pulse signal as the start timing of the 180-degree electrical angle period, rising of the B-phase excitation pulse signal as the intermediate timing of the 180-degree electrical angle period, and falling of the A-phase excitation pulse signal as the end timing of the 180-degree electrical angle period. An overcurrent detecting unit 142 outputs a logic value different between when a current flowing in the detection target phase exceeds a threshold and when otherwise. For example, the overcurrent detecting unit 142, when the current flowing in the detection target phase exceeds the threshold, outputs an H-level signal, and when otherwise, outputs an L-level signal. A PWM control period detecting unit 143, when the absolute value of the shunt resistance voltage related to the detection target phase is larger than zero, outputs an H-level signal, and when otherwise, outputs an L-level signal. Alternatively, the PWM control period detecting unit 143, when the shunt resistance voltage is larger than zero, may output an H-level signal, and when the shunt resistance voltage is smaller than or equal to zero, may output an L-level signal. The period during which the shunt resistance voltage is zero corresponds to a PWM OFF period, and the period during which the shunt resistance voltage is not zero corresponds to a PWM ON period.

A difference calculating unit 144 calculates a difference between a total PWM ON period of the detection target phase during the first-half 90-degree period and a total PWM ON period of the detection target phase during the second-half 90-degree period, during the 180-degree electrical angle period in the detection target phase, based on signals output from the timing generating unit 141, the overcurrent detecting unit 142 and the PWM control period detecting unit 143. Hereinafter, some specific configuration examples of the difference calculating unit 144 will be described.

Figure 7:
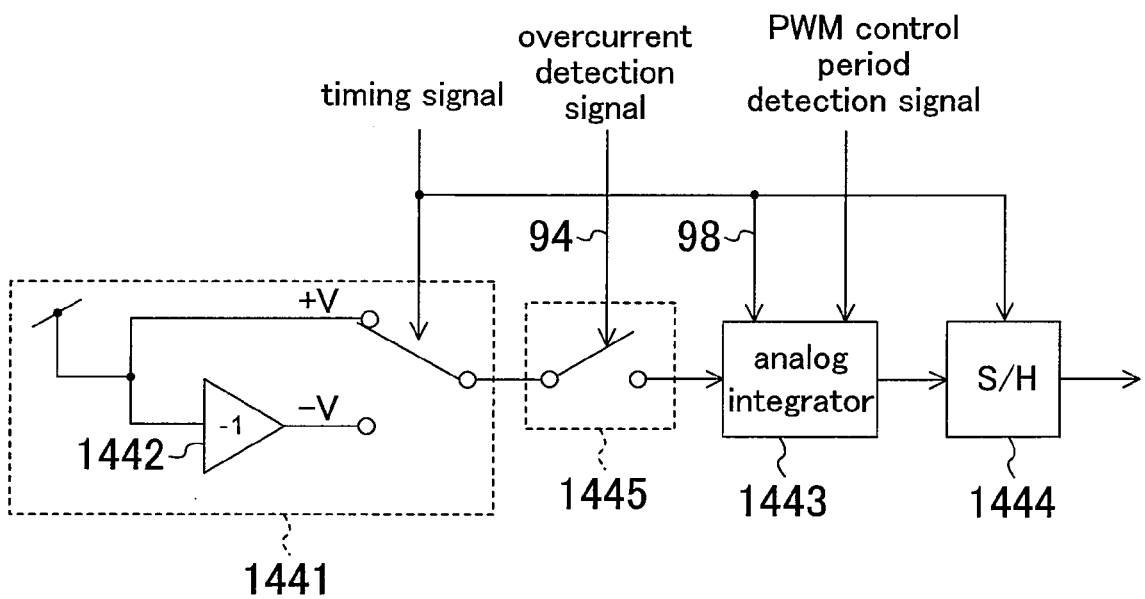
FIG. 7 is a diagram showing an internal configuration example of a difference calculating unit.

FIG. 7 shows an internal configuration example of the difference calculating unit 144. A power supply unit 1441 outputs a constant voltage "+V" during the first-half 90-degree period and a voltage "−V" that is obtained by inverting the voltage "+V" using an inverter 1442, during the second-half 90-degree period, in accordance with a timing signal. The inverter 1442 can be configured using, for example, an inverting amplifier having a gain of 1. Instead of the inverter 1442, a power supply that outputs the voltage "−V" may be provided. An analog integrator 1443 integrates supplied voltages during a time that the output signal of the PWM control period detecting unit 143 is at the H level. The analog integrator 1443 may be configured using, for example, an integral circuit including an operational amplifier. Also, the analog integrator 1443 receives a timing signal, and is reset at the start timing of the 180-degree electrical angle period of the detection target phase. A sampling/holding unit 1444 receives a timing signal, and samples and holds an output of the analog integrator 1443 at the end timing of the 180-degree electrical angle period of the detection target phase.

A switch 1445 is provided between the power supply unit 1441 and the analog integrator 1443. If the magnitude of the back electromotive force is calculated based on a PWM ON time, the switch 1445 is in the conductive state when the output signal of the overcurrent detecting unit 142 is at the L level, and is in the non-conductive state when the output signal of the overcurrent detecting unit 142 is at the H level. When the switch 1445 is in the non-conductive state, the analog integrator 1443 is not supplied with the output voltage of the power supply unit 1441. In other words, during a time that the output signal of the overcurrent detecting unit 142 is at the H level, the difference calculating unit 144 ignores PWM ON periods of the detection target phase. Also, when the magnitude of the back electromotive force is calculated based on a PWM duty, addition and subtraction may be performed by changing the output voltages by switching a switch of the power supply unit 1441, depending on ON/OFF of PWM while the switch 1445 is caused to be variably in the conductive state.

Figure 8:
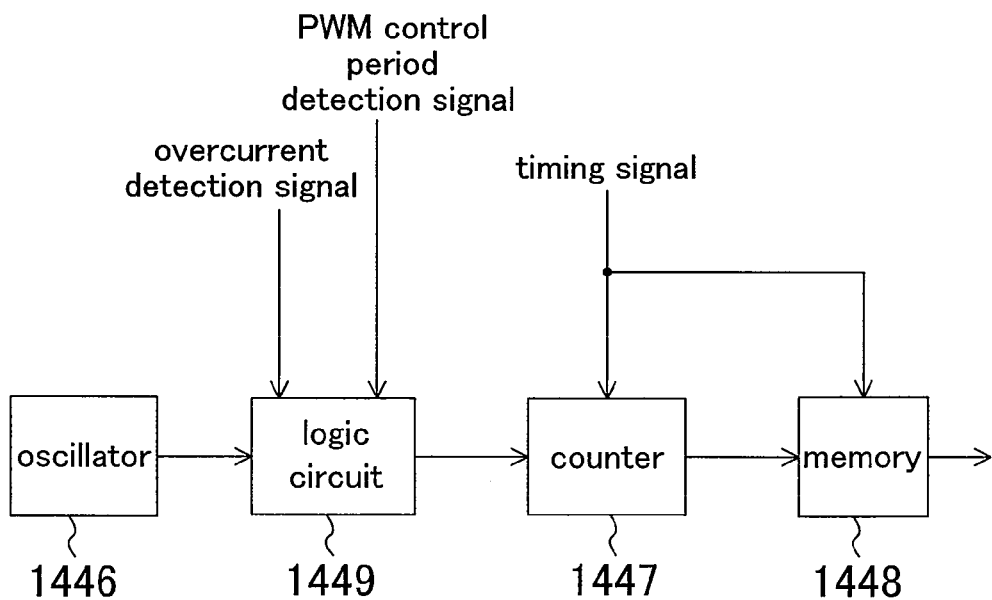
FIG. 8 is a diagram showing another internal configuration example of the difference calculating unit.

FIG. 8 shows another internal configuration example of the difference calculating unit 144. An oscillator 1446 generates a clock signal having a frequency sufficiently higher than that of the excitation control signal related to the detection target phase. A counter 1447 receives a timing signal, and counts up a supplied clock signal during the first-half 90-degree period, and counts down the supplied clock signal during the second-half 90-degree period. The counter 1447 is also reset at the start timing of the 180-degree electrical angle period of the detection target phase. A memory 1448 receives the timing signal, and stores the count value of the counter 1447 at the end timing of the 180-degree electrical angle period of the detection target phase.

A logic circuit 1449 is provided between the oscillator 1446 and the counter 1447. The logic circuit 1449 causes the clock signal to pass directly when the output signal of the overcurrent detecting unit 142 is at the L level and the output signal of the PWM control period detecting unit 143 is at the H level, and masks the clock signal when the output signal of the overcurrent detecting unit 142 is at the H level. In other words, when the output signal of the overcurrent detecting unit 142 is at the H level, the difference calculating unit 144 ignores PWM ON periods of the detection target phase. In this configuration example, the difference is calculated by a digital process, so that the difference can be calculated with higher precision.

Embodiment of Excitation Control Device

Referring back to FIG. 1, in an excitation control device 20, a control pulse generating unit 21 generates a control pulse for indicating a rotation angle of the motor 100. A reference voltage generating unit 22 generates a reference voltage required to determine a threshold when the motor 100 is driven with constant-current PWM.

A control unit 23 determines an optimal drive current value based on the output of the back electromotive force phase detecting device 14, and instructs the reference voltage generating unit 22 to change the reference voltage. Specifically, the control unit 23, when determining based on the output of the back electromotive force phase detecting device 14 that the motor 100 is likely to fall out of synchronization, instructs the reference voltage generating unit 22 to increase the reference voltage. For example, when the load torque is large, the drive torque is insufficient, so that the back electromotive force phase starts delaying. The control unit 23, when detecting the tendency of the back electromotive force phase to delay based on the output of the back electromotive force phase detecting device 14, instructs the reference voltage generating unit 22 to increase the reference voltage. As a result, the maximum current value supplied to the motor 100 increases, so that the insufficiency of drive torque is overcome and therefore the motor 100 is prevented from falling out of synchronization.

On the other hand, the control unit 23, when determining based on the output of the back electromotive force phase detecting device 14 that there is a sufficient drive torque margin that prevents the motor from falling out of synchronization, instructs the reference voltage generating unit 22 to decrease the reference voltage. For example, when the drive torque is larger than the load torque, the back electromotive force phase leads with respect to the drive current phase. The control unit 23, when detecting a lead in the back electromotive force phase based on the output of the back electromotive force phase detecting device 14, instructs the reference voltage generating unit 22 to decrease the reference voltage. As a result, the maximum current value supplied to the motor 100 decreases, so that the excessiveness of the drive torque is overcome and therefore the power consumption can be reduced.

If the drive torque is excessively larger or smaller than the load torque, then even when the reference voltage is slightly changed, the insufficiency or excessiveness of the drive torque is not overcome and therefore the output of the back electromotive force phase detecting device 14 does not substantially change. Also, a change in the driven state of the motor 100 is long and slow as compared to the cycle of the control pulse signal due to, for example, the inertia of a rotor (not shown) in the motor 100. Therefore, the control unit 23 preferably stores past control operations, their instruction times and the like, and when determining based on the tendency of changes in the output of the back electromotive force phase detecting device 14 that a change amount of the reference voltage is insufficient, preferably instructs the reference voltage generating unit 22 to more largely change the reference voltage. Thus, by adjusting the degree of a change in the reference voltage, the drive torque of the motor 100 can be more quickly converged to an optimal value.

Moreover, the control unit 23 may instruct the control pulse generating unit 21 to change a timing of generating a control pulse, thereby directly modifying a deviation of the back electromotive force phase. Specifically, the control unit 23, when detecting a delay or a lead in the back electromotive force phase based on the output of the back electromotive force phase detecting device 14, instructs the control pulse generating unit 21 to delay or advance the control pulse generation timing. Thus, by adjusting the control pulse generation timing, the excitation control of the motor 100 can be caused to be close to an ideal state that the drive current matches the phase of the back electromotive force. Moreover, by adjusting the degree of a change in the control pulse generation timing based on past control operations, the excitation control of the motor 100 can be more quickly caused to be close to the ideal state.

Note that when the control pulse generation timing is changed, the ON or OFF duty of the excitation pulse signal is likely to be deviated from an electrical angle of 180 degrees, so that the back electromotive force phase cannot be correctly detected. Therefore, the control unit 23 preferably ignores the output of the back electromotive force phase detecting device 14 immediately after the control pulse generation timing is changed, and thereafter, based on the correct detection result, preferably controls and changes the reference voltage and the control pulse generation timing.

Second Embodiment

Figure 9:
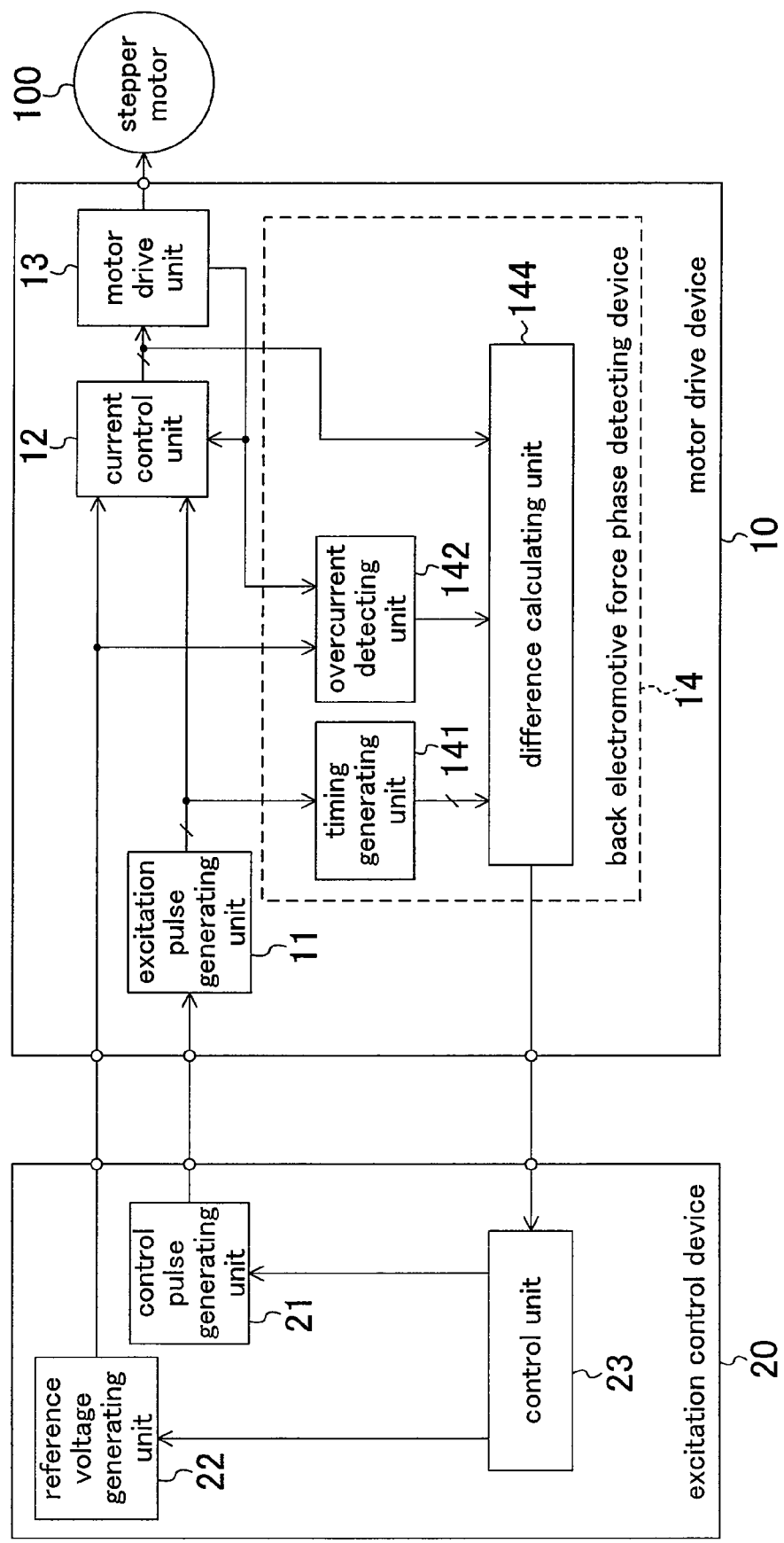
FIG. 9 is a diagram showing a configuration of a two-phase excitation stepper motor drive system according to a second embodiment.

FIG. 9 shows a configuration of a two-phase excitation stepper motor drive system according to a second embodiment. The second embodiment is different from the first embodiment in the following points. Specifically, in the back electromotive force phase detecting device 14, the difference calculating unit 144 receives an excitation control signal that is output as a signal indicating a PWM ON or OFF period from the current control unit 12. As shown in FIG. 3, the excitation control signals of the four transistors include signals indicating a PWM ON or OFF period, and therefore, the difference calculating unit 144 can obtain the PWM ON or OFF period from the excitation control signals. According to this embodiment, the PWM control period detecting unit 143 is not required, so that the circuit scale can be reduced.

Note that, the overcurrent detecting unit 142 can be removed in both the first and second embodiments. A PWM ON period when an overcurrent occurs is considerably short, so that it is considered that the difference calculation is less affected even if this period is included in the calculation. Also, in the motor drive unit 13, the motor coil 101 may be adapted into a pull-up configuration by removing the transistors Tr1 and Tr2 of FIG. 2. Alternatively, the motor coil 101 may be adapted into a pull-down configuration by removing the transistors Tr3 and Tr4 of FIG. 2. Also, the shunt resistance 131 may be provided between the power supply and the H bridge.

What is claimed is:

1. A device for detecting a back electromotive force phase of a motor coil of a two-phase excitation stepper motor that is driven with constant-current PWM, the device comprising:
   a timing generating unit for generating a timing signal indicating a start timing, an intermediate timing and an end timing of a 180-degree electrical angle period in a detection target phase, from excitation pulse signals indicating respective current passage directions of two current passage phases; and a difference calculating unit for receiving the timing signal, and calculating a difference between a total PWM control period of the detection target phase during a first-half 90-degree period defined by the start timing and the intermediate timing, and a total PWM control period of the detection target phase during a second-half 90-degree period defined by the intermediate timing and the end timing.

2. The back electromotive force phase detecting device of claim 1, wherein
the difference calculating unit receives an excitation control signal related to the detection target phase, and uses a period during which the excitation control signal is at a predetermined logic level, as a PWM control period of the detection target phase.

3. The back electromotive force phase detecting device of claim 1, comprising:
a PWM control period detecting unit for outputting a signal having a predetermined logic level during a time that an absolute value of a shunt resistance voltage related to the detection target phase is larger than zero,
wherein the difference calculating unit uses a period during which an output signal of the PWM control period detecting unit is at the predetermined logic level, as a PWM control period of the detection target phase.

4. The back electromotive force phase detecting device of claim 1, wherein the difference calculating unit includes:
a power supply unit for outputting a constant voltage whose polarity is reversed between during the first-half 90-degree period and during the second-half 90-degree period;
an analog integrator for integrating the output voltage of the power supply unit during the PWM control period of the detection target phase; and
a sampling/holding unit for sampling and holding an output of the analog integrator.

5. The back electromotive force phase detecting device of claim 1, wherein the difference calculating unit includes:
an oscillator for generating a clock signal having a frequency higher than that of the excitation control signal related to the detection target phase;
a counter for performing one of counting up and counting down of the clock signal during a PWM control period of the detection target phase during the first-half 90-degree period, and performing the other during a PWM control period of the detection target phase during the second-half 90-degree period; and
a memory for storing a count value of the counter.

6. The back electromotive force phase detecting device of claim 1, comprising:
an overcurrent detecting unit for outputting a signal having a predetermined logic level during a time that a current flowing in the detection target phase exceeds a threshold,
wherein the difference calculating unit ignores a PWM control period of the detection target phase during a time that the output signal of the overcurrent detecting unit is at the predetermined level.

7. An excitation control device for controlling a motor drive device for driving a stepper motor by two-phase excitation with constant-current PWM, the device comprising:
a control pulse generating unit for supplying a control pulse indicating a rotation angle of the stepper motor to the motor drive device;
a reference voltage generating unit for supplying to the motor drive device a reference voltage that is a reference for the constant-current; and
a control unit for instructing the reference voltage generating unit to change the reference voltage based on an output of the back electromotive force phase detecting device of claim 1.

8. The excitation control device of claim 7, wherein
the control unit instructs the control pulse generating unit to change the control pulse generation timing based on the output of the back electromotive force phase detecting device.

9. The excitation control device of claim 8, wherein
the control unit ignores the output of the back electromotive force phase detecting device immediately after changing the control pulse generation timing.

10. A method for detecting a back electromotive force phase of a motor coil of a two-phase excitation stepper motor that is driven with constant-current PWM, the method comprising the steps of:
generating a start timing, an intermediate timing and an end timing of a 180-degree electrical angle period in a detection target phase, from excitation pulse signals indicating respective current passage directions of two current passage phases; and
calculating a difference between a total PWM control period of the detection target phase during a first-half 90-degree period defined by the start timing and the intermediate timing, and a total PWM control period of the detection target phase during a second-half 90-degree period defined by the intermediate timing and the end timing.

11. The back electromotive force phase detecting method of claim 10, wherein
the PWM control period of the detection target phase is a period during which an excitation control signal related to the detection target phase is at a predetermined logic level.

12. The back electromotive force phase detecting method of claim 10, wherein
the PWM control period of the detection target phase is a period during which an absolute value of a shunt resistance voltage related to the detection target phase is larger than zero.

13. The back electromotive force phase detecting method of claim 10, comprising:
selecting a constant voltage whose polarity is reversed between during the first-half 90-degree period and during the second-half 90-degree period;
integrating the selected voltage during the PWM control period of the detection target phase; and
sampling and holding a result of the integration at the end timing.

14. The back electromotive force phase detecting method of claim 10, comprising:
generating a clock signal having a frequency higher than that of the excitation control signal related to the detection target phase;
performing one of counting up and counting down of the clock signal during a PWM control period of the detection target phase during the first-half 90-degree period, and performing the other during a PWM control period of the detection target phase during the second-half 90-degree period; and
storing a result of the counting operation at the end timing.

15. The back electromotive force phase detecting method of claim 10, wherein
in the difference calculating step, the PWM control period of the detection target phase is ignored during a time that a current flowing in the detection target phase exceeds a threshold.

16. An excitation control method for controlling a motor drive device for driving a stepper motor by two-phase excitation with constant-current PWM, the method comprising the steps of:
supplying a control pulse indicating a rotation angle of the stepper motor to the motor drive device;
supplying to the motor drive device a reference voltage that is a reference for the constant-current; and
changing the reference voltage based on a result of detection by the back electromotive force phase detecting method of claim 10.

17. The excitation control method of claim 16, comprising:
changing the control pulse generation timing based on the detection result of the back electromotive force phase detecting method.

18. The excitation control method of claim 17, wherein
in the reference voltage changing step and the control pulse generating timing changing step, the detection result of the back electromotive force phase detecting method immediately after changing the control pulse generation timing is ignored.

* * * * *